United States Patent [19]

Martucci

[11] Patent Number: 4,675,120
[45] Date of Patent: Jun. 23, 1987

[54] METHODS OF USING STRONG ACIDS MODIFIED WITH ACID SOLUTIONS

[75] Inventor: David J. Martucci, Key Biscayne, Fla.

[73] Assignee: An-Son Petrochemical, Inc., Miami, Fla.

[21] Appl. No.: 513,408

[22] Filed: Jul. 14, 1983

Related U.S. Application Data

[63] Continuation-in-part of Ser. No. 446,250, Dec. 2, 1982, abandoned, which is a continuation-in-part of Ser. No. 434,515, Oct. 15, 1982, abandoned.

[51] Int. Cl.$^4$ .............................................. E21B 43/27
[52] U.S. Cl. .................................. 252/8.553; 134/3; 166/307; 208/46; 208/428; 252/136; 252/8.552; 429/198
[58] Field of Search ................. 252/8.55 C; 166/307

[56] References Cited

U.S. PATENT DOCUMENTS

| 1,990,969 | 2/1935 | Wilson | 252/8.55 |
| 3,122,204 | 2/1964 | Oakes | 252/8.55 X |
| 3,142,335 | 7/1964 | Dill et al. | 166/307 |
| 3,505,235 | 4/1970 | Muzyczko et al. | 252/82 |
| 3,630,933 | 12/1971 | Dudlik et al. | 252/148 |
| 3,920,566 | 11/1975 | Richardson et al. | 252/8.55 |
| 4,101,426 | 7/1978 | Maly et al. | 252/8.55 |
| 4,116,713 | 9/1978 | Otrhalek et al. | 134/3 |
| 4,213,866 | 7/1980 | Ashby et al. | 252/8.55 |
| 4,371,443 | 2/1983 | Keeney | 252/8.55 |

FOREIGN PATENT DOCUMENTS 2110744  6/1983  United Kingdom ............... 252/8.55

Primary Examiner—Herbert B. Guynn
Attorney, Agent, or Firm—Lyon & Lyon

[57] ABSTRACT

Acidic compositions comprising mixtures of hydrochloric, phosphoric, oxalic and citric acids, optionally additionally containing oleic, hydrofluoric or sulfuric acid and methods of preparing the acidic mixtures. Uses for certain mixtures of the acids include treating crude oil, in oil recovery processes, for well acidizing, cleaning glass, in batteries, removing corrosion from metals, removing oil residues from oil handling equipment and reactivating wells clogged with asphaltene.

11 Claims, 1 Drawing Figure

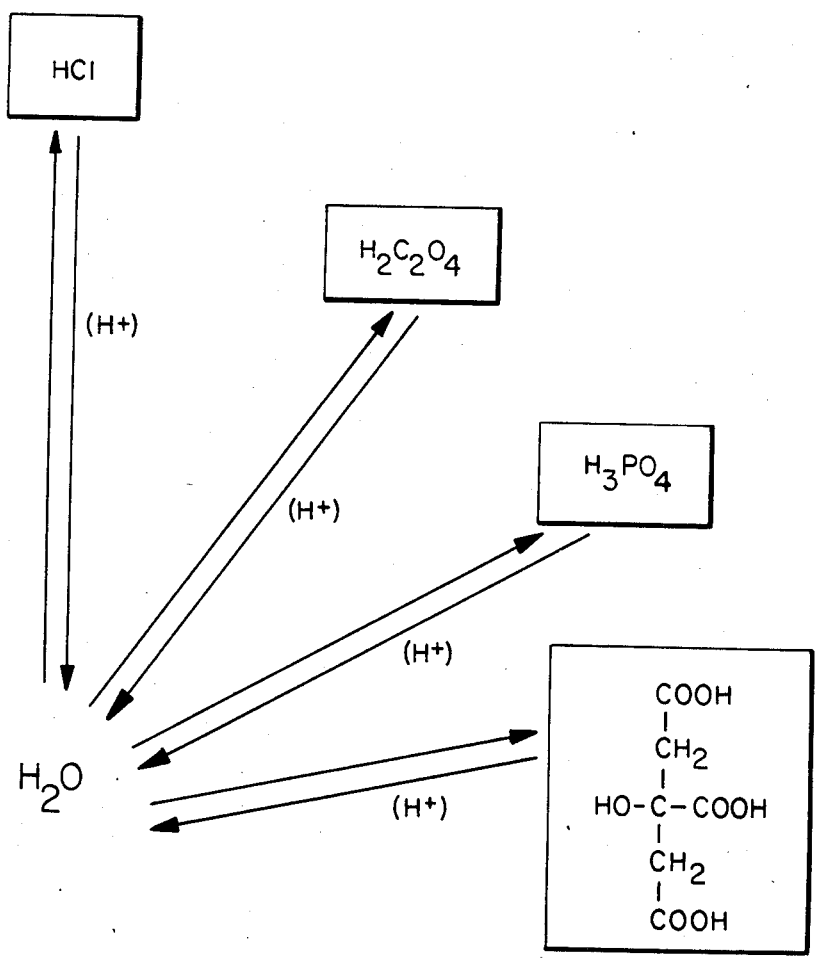

METHODS OF USING STRONG ACIDS MODIFIED WITH ACID SOLUTIONS

RELATED APPLICATIONS

This application is a continuation-in-part of application Ser. No. 446,250 filed Dec. 2, 1982, which is in turn a continuation-in-part of application Ser. No. 434,515 filed Oct. 15, 1982, both now abandoned. The entire disclosures of both Ser. Nos. 446,250 and 434,515 are incorporated herein by reference.

TECHNICAL FIELD

The present invention relates to the use of acid solutions in general and more particularly concerns the use of a low pH mixture of acids wherein the availability of hydronium ions in the mixture is highly controllable while the mixture itself remains non-corrosive to metals and innocuous to skin or other organic materials.

DISCLOSURE OF THE INVENTION

According to conventional modes of thinking, weak acids can be combined with acid salts to provide an acidic solution which exhibits moderate pH levels at equilibrium. By following the teachings of the present invention, it is also possible to establish a system of equilibrium using strong acids with one of the corresponding strong acid salts. The system is obtained by respectively combining the strong acid with another strong acid and two relatively weaker acids in the presence of water such that the conjugate bases of the relatively weaker acids serve as strong bases for controlling the hydronium ion availability or production from the strong acids. In this manner, the characteristics of the strongest of the two strong acids can be favorably modified.

It is therefore an object of the present invention to provide an acid solution which exhibits characteristically low pH levels coupled with highly controllable hydronium ion availability.

It is another object of the present invention to provide a low pH mixture of acids, which mixture is non-corrosive to metal and innocuous to skin or other organic materials.

It is still another object of the present invention to provide a mixture of two strong/weak acid pairs wherein the dissociation of the relatively weaker acid in each acid pair supplies a conjugate base capable of functioning as a strong base relative to the strong acid in each pair, thereby furnishing a means to control the hydronium ion availability or production from the strong acid.

BRIEF DESCRIPTION OF THE DRAWING

The various features, objects and advantages of the present invention will become more apparent upon consideration of the following Brief Description Of The Drawing and Best Mode For Carrying Out The Invention, in which the sole FIGURE illustrates the flow of hydronium ions in an acid mixture formed in accordance with the teachings of the present invention.

BEST MODE FOR CARRYING OUT THE INVENTION

As indicated above, two strong and two weak acids are mixed to establish a mechanism for controlling hydronium ion availability in the acids. A first balancing system is maintained between the conjugates of one of the strong acids and the conjugates of a relatively weaker acid. The remaining pair of acids likewise form a balancing system consisting of relatively strong and relatively weak acid conjugates. For present purposes, hydrochloric acid (HCl) and oxalic acid ($H_2C_2O_4$) are chosen as the strong acids while phosphoric acid ($H_3PO_4$) and citric acid are chosen as the weak acids relative to the strong acids.

From a comparative point of view, the application of Bronsted-Lowry theory to the acid dissociation reactions of hydrochloric, oxalic, phosphoric and citric acids will yield the following relationships between the conjugates of each acid:

TABLE I

| Acid | α | Conjugate Relationship |
|---|---|---|
| HCl | =1 | strong acid/weak conj. base |
| $H_3PO_4$ | <1 | weak acid/strong conj. base |
| $H_2C_2O_4$ | =1 | strong acid/weak conj. base |
| citric | <1 | weak acid/strong conj. base |

The relationship expressed in Table I can better be understood by observing the actual dissociation reactions of each acid within the context of the two strong-/weak acid systems. The first system of strong/weak acid pairs is created by mixing the hydrochloric and phosphoric acids. In a water environment, hydrochloric acid dissociates according to the following equation:

$$HCl + H_2O \rightarrow Cl^- + H_3O^+ \qquad (1)$$

Similarly, in a water environment, phosphoric acid is dissociated into three ionization states of decreasing strength as respectively characterized by Equations (2)–(4):

$$H_3PO_4 + H_2O \rightleftharpoons H_2PO_4^- + H_3O^+ \qquad (2)$$

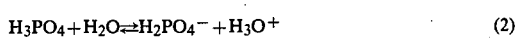

$$H_2PO_4^- + H_2O \rightleftharpoons HPO_4^{-2} + H_3O^+ \qquad (3)$$

$$HPO_4^{-2} + H_2O \rightleftharpoons PO_4^{-3} + H_3O^+ \qquad (4)$$

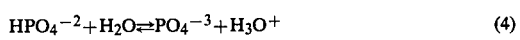

The main source of hydronium ions in the mixture of hydrochloric and phosphoric acids is provided by the dissociation of the hydrochloric acid. Theoretically, it can be seen that the chlorine ions $Cl^-$ also produced as a result of the dissociation expressed in Equation (1) provide a salt for the hydrochloric acid. Given the strength of the hydrochloric acid, however, the chlorine ions as a practical matter cannot reassociate with hydronium ions at a rate fast enough to maintain a state of equilibrium during dissociation. Hence, the production of hydronium ions in pure hydrochloric acid remains unregulated. In contrast, when phosphoric acid is added to the hydrochloric acid, the dissociation of phosphoric acid will serve as a partial regulator or controller of the hydronium availability in the hydrochloric/phosphoric acid mixture. Such regulation occurs because the first ionization state of phosphoric acid, i.e., $H_2PO_4^-$, is present in relatively great concentration within the mixture of hydrochloric and phosphoric acids. While considered a semi-weak base per se, the first ionization state of phosphoric acid acts as a relatively strong base in the presence of the strong hydrochloric acid. Consequently, the first ionization constant of phosphoric acid plays a primary role in capturing free hydronium ions present in the mixture of hydrochloric and phosphoric acids.

Despite the modifying effect of phosphoric acid on hydrochloric acid, the level of hydronium ion availability in a mixture of hydrochloric and phosphoric acids is too high to provide effective control over the mixture. A second pair of strong and weak acids, e.g., oxalic and citric acids, must therefore be introduced to the mixture before actual control can be achieved. To this end, oxalic and citric acid are added to the hydrochloric/phosphoric mixture to provide a second strong/weak acid pair. The dissociation reactions of oxalic and citric acids are again analyzed in a water environment, respectively yielding the following equations:

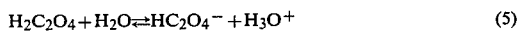

$$H_2C_2O_4 + H_2O \rightleftharpoons HC_2O_4^- + H_3O^+ \quad (5)$$

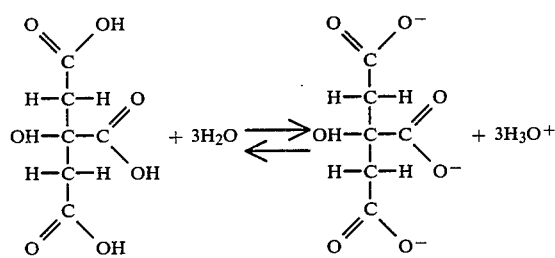

Although the hydrochloric acid serves as the primary source of hydronium ions in the two strong/weak pairs of acids, the oxalic acid is a relatively strong acid in its own right and thus constitutes a secondary source of hydronium ions when added to the mixture of hydrochloric and phosphoric acids. The availability of the additional hydronium ions from the oxalic acid is quite important inasmuch as these additional hydronium ions are responsible for the low pH of the full solution, i.e., the solution of hydrochloric, phosphoric, oxalic and citric acids.

The action of the citric acid in the full solution is also important. Adding oxalic acid alone to the hydrochloric and phosphoric acid mixture would produce an overabundance of hydronium ions, destroying the sought-after control of hydronium ion availability. The citric acid, however, is considered a weak acid, particularly in relation to the oxalic acid. As a result, the ionization state of the citric acid serves as a strong conjugate base for the oxalic acid. This strong conjugate base in turn provides a secondary mechanism for controlling the availability of hydronium ions from both the primary and secondary hydronium ion sources, i.e., from both the hydrochloric and oxalic acids, in the full solution.

The entire mechanism for achieving control over hydronium ion availability in the mixture of the present invention can now be understood. The first ionization state of phosphoric acid created by combining the first strong/weak or hydrochloric/phosphoric acid pair and the ionization state of citric acid created by combining the second strong/weak or oxalic/citric acid pair act in concert as relatively strong bases to regulate the production of free hydronium ions within the solution. The first ionization state of phosphoric acid and the ionization state of citric acid are both decreased by respectively drawing off free hydronium ions, thereby causing an increase in the concentration of phosphoric acid and citric acid in the solution. This latter condition favors the ionization state of the hydrochloric and oxalic acids, in the process providing a strong source of hydronium ions and allowing the dissociation reactions expressed in Equations (2) and (6) to reach a state of equilibrium. The ionization of the oxalic acid additionally produces oxalate ions which act as a strong base relative to the hydrochloric acid, providing another means for capturing hydronium ions. As a net result, overall control of hydronium ion availability in the full solution is readily attainable notwithstanding the very low pH of the solution.

It should be noted in connection with the dissociation reactions discussed above that water plays a key role in the actual ionizing and dissociation mechanisms of the various acids in the present invention. Equations (1), (2), (5) and (6) all demonstrate that water functions as a strong "base" during the dissociation reactions, furnishing a carrier for the hydrogen ions released by the acids of the present invention. In this manner, the various dissociations are greatly facilitated while the exchange of hydronium ions necessary to maintain equilibrium between the various dissociations and reassociations, and hence control over hydronium ion availability, is achieved. The key role of water in the present invention, and in particular the role of water in transporting hydronium ions between the reactants of Equations (1), (2), (5) and (6), is amply illustrated in the FIGURE.

EXAMPLE 1

Table II lists the relative concentrations of hydrochloric acid, phosphoric acid, oxalic acid, citric acid and water in one preferred embodiment of the present invention.

TABLE II

| Component | % Concentration By Weight |
| --- | --- |
| Hydrochloric Acid (HCL, d = 1.19 g/cc) | 7.5 |
| Phosphoric Acid (H₃PO₄, d = 1.70 g/cc) | 7.5 |
| Oxalic Acid (H₂C₂O₄) | 3 |
| Citric Acid | 3 |
| Water | 79 |

In order to establish the initial states of equilibrium between the various acids, the components listed in Table II are combined in the following sequence:

(a) The hydrochloric and phosphoric acids are mixed at ambient temperature in a first reactor and vigorously agitated for at least ten minutes.

(b) The oxalic acid, which is generally in solid form, is placed in a second reactor at ambient temperature and is completely solubilized under continuous agitation using 25% of the total volume of water specified in Table II.

(c) Following solubilization of the oxalic acid, the total contents of the first reactor (e.g., the mixture of hydrochloric and phosphoric acids) is added to the second reactor while vigorously agitating at ambient temperature.

(d) The citric acid, which is also in solid form, is thereafter added to the second reactor at ambient temperature and solubilized under continuous agitation using the remaining water.

The solution prepared according to the foregoing sequence of steps is characteristically modified in the sense that the solution is non-corrosive and non-toxic, e.g., innocuous to skin. More particularly, the solution of Table II will not corrode the surfaces of metals such as iron, steel, inox-steel, copper or aluminum, nor will it attack organic substances such as skin, cloth or rubber. The exact manner by which the solution avoids damage to the skin has not yet been determined, but one of two mechanisms is currently thought to be responsible for protecting the skin in the presence of the solution. First, it may be that the citric and phosphoric acid components of the solution react to form a citrophosphate derivative which thereafter covers the surface of the skin to provide a protective film or barrier against the hydronium ions. Alternately, the presence of organic acids within the skin may assist in establishing a rapid changeover of hydronium ions on the skin, i.e., may assist in rapidly reassociating the hydronium ions following their dissociation from the various acids existing in the solution. Regardless of the reason, however, it has been demonstrated that the solution of Table II can safely be brought into contact with skin.

Although exhibiting the beneficial characteristics discussed above, the solution of Table II maintains a high level of acidizing potential. That is, the pH level of the solution is quite low, generally on the order of less than 1. Consequently, the Table II solution can perform conventional acidizing functions. The solution may, for instance, be used to remove oxides from metallic surfaces. Typical oxidation removal reactions for iron are disclosed in Equations (7), (8) and (9):

$$Fe_2O_3 + 6H_3O^+ \rightarrow 2Fe^{+3} + 9H_2O \qquad (7)$$

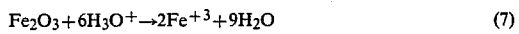

$$3H_3O^+ + Fe_2O_3 + 3HC_2O_4^- \rightarrow Fe_2(C_2O_4)_3 + 6H_2O \qquad (8)$$

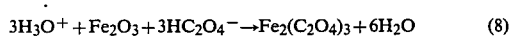

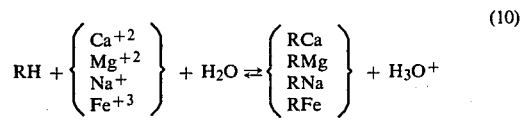

where R represents the resin bed, the cationic resin in its original state is indicated as RH and $Ca^{+2}$, $Mg^{+2}$, $Na^+$ and $Fe^{+3}$ are representative cations. As can be seen from Equation (10), the hydrogen ions originally bonded to the resin are gradually replaced by the cations present in the water. Eventually, the resin will exhaust its capacity to grab cations and will no longer provide proper filtration. At this point, organic material such as bacteria or algae can collect in the interstitial regions of the resin. Calcium compounds such as calcium sulphate ($CaSO_4$) and complex iron compounds can also build up in the resin. In order to regenerate the cation-grabbing capacity of the resin, some means must be found to remove the cations as well as the organic material and other debris from the resin. The solution of Table II fulfills this function by supplying hydronium ions in abundance to assist in reversing the reaction of Equation (10). In other words, when an exhausted cationic resin is immersed in Table II solution, the abundance of hydronium ions in the solution facilitates replacement of the cations with hydrogen ions in the

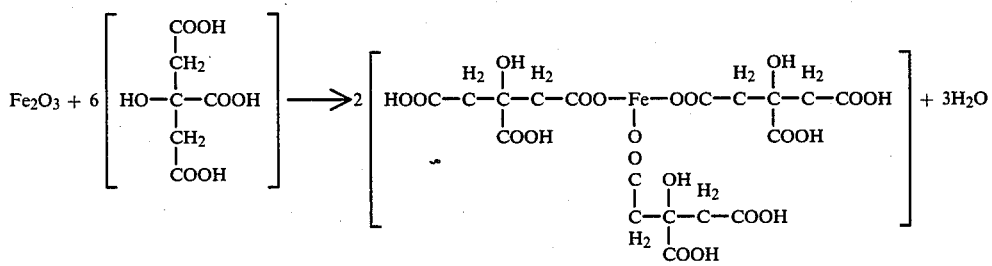

(9)

When the solution of Table II is brought into contact with oxidized iron, the hydronium ions and the ionization states of oxalic and citric acids present at any given moment in the solution simply dissolve the iron oxides according to Equations (7)–(9), leaving water and metallic ions on the surface of the iron. Where metals other than iron are involved, removal of oxides from the metal surfaces proceeds in similar fashion.

The intense activity of the Table II solution during removal of metallic surface oxides additionally results in modification of the energy fields at the metal surface, thus passivating the metal surface to prevent reoxidation for significant periods of time. Indeed, it has been observed that metal surfaces treated with the solution of Table II remain passivated, i.e., resistant to reoxidation, for ten hours or more. The modification of surface energy fields also serves to activate the metal surface in preparation for galvanizing operations.

Yet another use for the solution of Table II involves the cleaning of cationic resins. Cationic resins are employed in industry to remove or filter out various cations otherwise present in water flowing through the resins. Equation (10) illustrates the resin filtering operation:

exhausted resin, producing regenerated resin and solubilized cations. The solubilized cations are then washed away and the regenerated resin is ready to perform its filtering function again.

While regeneration of the resin is occurring, the Table II solution dissolves or breaks up the organic material and the calcium and iron compounds which have collected in the resin. The exact mechanism by which the calcium compounds are removed is illustrated in Equation (11):

$$2HCl + CaSO_4 \rightarrow CaCl_2 + H_2SO_4 \qquad (11)$$

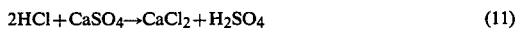

where $CaCl_2$ and $H_2SO_4$ are both in solution form. The exact mechanism by which the Table II solution removes organic material and complex iron compounds from the resins is more difficult to pinpoint, but results of field testing of the Table II solution confirm that the Table II solution is in fact effective in removing residues, whether organic or inorganic, from cationic resins.

The use of Table II solution in performing the foregoing oxidation removal, passivation, activation and cleaning activities is most effective if carried out at temperatures which do not exceed 55° C.

EXAMPLE 2

If desired, the ability to control hydronium ion availability in the solution of Table II can be enhanced by adding a salt of oxalic acid to the solution of Table II. Potassium tetraoxalate ($KHC_2O_4 \cdot H_2C_2O_4$), potassium bioxalate ($KHC_2O_4$) and potassium oxalate ($K_2C_2O_4$) comprise well-known oxalic acid salts. The dissociation reaction for potassium tetraoxalate is listed as follows:

$$KHC_2O_4 \cdot H_2C_2O_4 + 2H_2O \rightleftharpoons K^+ + HC_2O_4^- + C_2O_4^{-2} + 2H_3O^+ \quad (12)$$

The dissociation for potassium bioxalate may be expressed as $$KHC_2O_4 + H_2O \rightleftharpoons H_3O^+ + C_2O_4^{-2} + K^+ \quad (13)$$

Finally, the dissociation reaction for potassium oxalate may be expressed as:

$$K_2C_2O_4 + H_2O \rightleftharpoons 2K^+ + C_2O_4^{-2} + H_2O \quad (14)$$

As examination of Equations (12)–(14) reveals, the various ionization reactions of the oxalic acid salts produce relatively weak bases in the form of oxalate ions within the mixture of hydrochloric, phosphoric, oxalic and citric acids. The free hydronium ions in the mixture can be captured by the oxalate ions to provide further control over hydronium ion availability as indicated above.

The relative concentration of components in a preferred embodiment of an acid solution containing oxalic acid salts is listed in Table III.

TABLE III

| Component | % Concentration By Weight |
|---|---|
| Hydrochloric Acid ($HCl$, d = 1.19 g/cc) | 7.5 |
| Phosphoric Acid ($H_3PO_4$, d = 1.70 g/cc) | 7.5 |
| Oxalic Acid ($H_2C_2O_4$) | 1 |
| Citric Acid | 3 |
| Oxalic Acid Salt (e.g., potassium tetraoxalate, potassium bioxalate or potassium oxalate) | 1 |
| Water | 80 |

The various components from Table III are combined at ambient temperature in the following sequence:

(a) The hydrochloric and the phosphoric acids are mixed in a first reactor and vigorously agitated for at least ten minutes.

(b) The oxalic acid salt is placed in a second reactor and is completely solubilized under continuous agitation using 25% of the total volume of water specified in Table III.

(c) After the oxalic acid salt is completely dissolved, the mixture of hydrochloric and phosphoric acids from the first reactor is added to the second reactor under continuous agitation.

(d) The oxalic acid, which is generally in solid form, is placed in a third reactor and is completely solubilized using half of the remaining water.

(e) Following solubilization of the oxalic acid, the total contents of the second reactor (e.g., the mixture of hydrochloric and phosphoric acids and oxalic acid salt) is added to the third reactor while vigorously agitating.

(f) The citric acid, which is also in solid form, is thereafter placed in the third reactor and solubilized using the other half of the remaining water.

As was the case with the Table II solution, the Table III solution is both non-corrosive and non-toxic, e.g., innocuous to skin. The Table III solution in general will remove metallic oxides or rust from metal surfaces according to Equations (7)–(9). Specifically recalling Equation (8), it should be evident that the increase in oxalate ions ($C_2O_4^{-2}$) provided by the dissociation of oxalic acid salts in the mixture of hydrochloric, phosphoric, oxalic and citric acids increases the oxide-removing capacity of the mixture. Like the Table II solution, the solution of Table III will also act to passivate those metal surfaces from which the oxides are being removed. In fact, the Table III solution is more effective in preventing reoxidation of the metal surfaces than the Table II solution. Metal surfaces treated with a Table III solution employing potassium oxalate can be passivated for forty hours, while metallic surfaces treated with a Table III solution employing potassium tetraoxalate can be passivated for up to sixty hours. The Table III solution can additionally activate metallic surfaces in preparation for galvanizing or electroplating and can clean the surfaces of aluminum alloys.

The solution of Table III has been effectively used to clean magnesium or calcic salt deposits (e.g., $MgCO_3$ or $CaCO_3$) from boilers, heat exchangers or the like exposed to hard water. Equation (15) illustrates the reaction which occurs when calcium carbonate is dissolved:

$$CaCO_3 + 2H_3O^+ \rightarrow Ca^{+2} + CO_2 + 3H_2O \quad (15)$$

Equation (16) similarly illustrates the reaction which occurs when magnesium carbonate is dissolved:

$$MgCO_3 + 2H_3O^+ \rightarrow Mg^{+2} + CO_2 + 3H_2O \quad (16)$$

The enhanced availability of hydronium ions in the Table III solution effectively removes magnesium and calcic salt deposits in accordance with Equations (15) and (16), leaving gaseous carbon dioxide, solubilized calcium and magnesium ions and water. These latter components can easily be flushed from the boiler or heat exchanger.

When potassium tetraoxalate is employed as the oxalic acid salt in the Table III solution, the degree of control over hydronium ion availability in the solution is such that the solution may successfully be utilized for cleaning delicate industrial components such as turbine blades. A Table III solution containing potassium tetraoxalate may also be utilized to prepare metallic surfaces for painting or metal plating with copper, nickel, and chromium.

The use of Table III solutions in performing the foregoing oxidation removal, passivation, activation and cleaning activities is most effective if carried out at temperatures below 70° C. for solutions containing potassium oxalate and below 80° C. for solutions containing potassium tetraoxalate.

EXAMPLE 3

Having established a means for controlling or modifying the release of hydronium ions in hydrochloric acid as disclosed above, further regulation of hydronium ion release in other acids or acid combinations can be now achieved. More particularly, the solutions of Tables II and III can be mixed with various acids to enhance the properties of each such acid and to control hydronium ion availability therein. For instance, six parts of Table III solution containing potassium oxalate can be added to four parts hydrochloric acid (HCl, density=1.19 g/cc) at ambient temperature to provide a mixture suitable for cleaning carbonate deposits and oxide deposits from industrial structures such as cooling towers. When so used, the mixture is diluted with water to an aqueous concentration of between 3% and 10%.

EXAMPLE 4

Table II solution diluted to 20% aqueous concentration can be combined in equal parts with hydrofluoric acid (HF) likewise diluted to 20% aqueous concentration to provide a mixture capable of cleaning glass. The mixture will remove grease or oil films as well as alkaline films from glass. The mixture will also dissolve any sediment, calcareous matter or organic matter buildup on glass, and will dissolve any oxides of metal which are present on glass surfaces. All of the foregoing cleansing activities can be accomplished by applying the mixture to the glass at the start of the cleaning operation. Any acid remains on the glass following cleaning can be removed by washing with water.

EXAMPLE 5

When three parts of Table II solution are added to one part pure sulfuric acid ($H_2SO_4$, density=1.84 g/cc at ambient temperature, the resulting mixture is a noncorrosive, non-toxic (innocuous to skin) liquid which can be used as an additive for battery acids or as a battery acid replacement.

EXAMPLE 6

A material suitable for use in removing heavy corrosion from metal surfaces can be formed by combining the Table II solution at ambient temperature with additional amounts of hydrochloric, phosphoric, hydrofluoric and sulfuric acids as follows:

(a) Thirty parts of hydrochloric acid (HCl, density=1.19 g/cc) are mixed in a first reactor with ten parts phosphoric acid ($H_3PO_4$, density=1.70 g/cc).

(b) Ten parts hydrofluoric acid (HF, density=1.42 g/cc) are slowly added to the mixture of hydrochloric and phosphoric acids in the first reactor.

(c) In a second reactor, twenty-five parts sulfuric acid ($H_2SO_4$, density=1.84 g/cc) are added to twenty-five parts of Table II solution. The temperature of the resulting mixture will rise due to the exothermic nature of the reaction between the various acids in the mixture.

(d) After the sulfuric acid and Table II mixture in the second reactor cools to ambient temperature, the hydrochloric, phosphoric and hydrofluoric acid mixture from the first reactor is added to the second reactor.

(e) Glycerin is then added to the final acid mixture in the second reactor to form a solution of 5% glycerin and 95% acid mixture.

As indicated above, the glycerin and acid mixture of Example 6 is suitable for use in removing heavy corrosion from metal surfaces. The mixture remains essentially innocuous to skin and will not attack iron or copper surfaces when brought into contact with such surfaces for relatively short periods of time, i.e., for periods of less than one hour.

EXAMPLE 7

One of the more promising applications of the present invention involves the tertiary recovery of crude oil and gas from geological formations. As is known to those skilled in the art, primary oil and gas recovery operations involve the drilling of a well bore into a subterranean formation of oil or gas-bearing rock. The oil or gas is thereafter pumped into the well bore from naturally occurring channels or reservoirs in the rock structure and brought to the surface. As long as the oil or gas is present in and can freely flow through the channels or reservoirs in the rock structure, primary recovery methods prove adequate for removing oil or gas from subterranean locations. Unfortunately, much of the world's oil and gas reserves are not so readily available. Rather, the oil or gas may have become entrapped in solid material such as clay or limestone. Silicate compounds surrounding oil may bind with the oil to create tar sands. Finally, even if the oil or gas was once present in unobstructed channels and pores in oil-bearing rock, the channels and pores may have become clogged with wax or other organic buildup to the extent that oil or gas flow from the rock into the well bore is blocked.

Conventional primary recovery processes are ineffective in removing oil and gas which is geologically entrapped. Tertiary recovery methods have accordingly been developed to break down the subterranean formations which bind oil and gas or obstruct free oil and gas flow. Typically, oil wells are acidized or reactivated to increase the yields therefrom. Acidizing of an oil well is accomplished by pumping an acid solution into the well bore, whereupon the acid solution penetrates the surrounding gas or oil-bearing rock or other geological structure to dissolve obstructions and aid in the free flow of the entrapped gas or oil. As can be appreciated, care must be taken to insure that the acid solution introduced into the well bore does not injure the well operators or damage the well bore casing and well pumping apparatus. Prior art techniques for acidizing wells frequently employ chemical inhibitors which diminish the tendency of relatively weak acidizing solutions to corrode metal. Inhibiting techniques, however, at best only partially succeed in solving the problems associated with well acidification. Prior art inhibitors are incapable of controlling the corrosive effect of strong acids, e.g., hydrochloric and hydrofluoric acids, and otherwiee desirable acidizing solutions containing such acids have heretofore been unavailable. The solutions of the present invention, on the other hand, allow well acidification to proceed with minimal corrosive effects while using more concentrated acids, thus furnishing an efficient, economical and environmentally safe means for carrying out tertiary oil and gas recovery.

One embodiment of the present invention particularly suited for acidifying oil wells drilled into calcareous formations, e.g., limestone or lime-impregnated formations, can be obtained by modifying hydrochloric acid with a solution consisting of the various components listed in Table IV.

TABLE IV

| Component | % Concentration By Weight |
|---|---|
| Hydrochloric Acid (HCl) | 21.00 |
| Phosphoric Acid ($H_3PO_4$) | 5.28 |
| Oxalic Acid ($H_2C_2O_4$) | 0.95 |
| Citric Acid | 1.92 |
| Urotropine | 3.60 |
| Water | 67.25 |

The Table IV components are combined at ambient temperatures in the following sequence:

(a) The hydrochloric and phosphoric acids are mixed in a first reactor and vigorously agitated for at least ten minutes.

(b) The oxalic acid is placed in a second reactor and is completely dissolved using 25% of the total volume of water specified in Table IV.

(c) After the oxalic acid is completely dissolved, the mixture of hydrochloric and phosphoric acids from the first reactor is added to the mixture of the second reactor. Simultaneously, the citric acid is added to and dissolved in the mixture of the second reactor.

(d) Following solubilization of the citric acid, the remaining water is added to the second reactor.

(e) At least 20% of the contents of the second reactor are then placed in a third reactor and the urotropine is slowly dissolved therein. While the urotropine is being dissolved, the remaining contents of the second reactor are added to the third reactor.

Once the Table IV solution has been prepared, it is mixed with hydrochloric acid (HCl, density=1.19 g/cc) in a ratio ranging anywhere from twenty to thirty parts Table IV solution and eighty to seventy parts HCl. When pumped down a well at temperatures below 176° F., the foregoing mixture is quite effective in breaking down and dissolving calcareous formations to permit recovery of oil or gas otherwise trapped in the formations. In addition, the nitrogen and hydrogen radicals of urotropine from the Table IV solution in the mixture combine with hydrogen to create ammonia and ionized ammonia according to the following Equations:

$$NH_2^- + H_3O^+ \rightleftharpoons NH_3 + H_2O \qquad (18)$$

$$NH_3 + H_3O^+ \rightleftharpoons NH_4^+ + H_2O \qquad (19)$$

The ammonia and ionized ammonia aid in dissociation of any tricalcic salts which may be produced as a result of the reaction of the mixture of Example 7 with the calcareous formation. Oil or gas released from the calcareous formation can thereafter flow freely into the well bore and can be brought to the surface of the well with minimum effort. As with all of the embodiments of the present invention, the mixture of Example 7 will not corrode or attack the metallic structures in the well bore or the pumping apparatus.

EXAMPLE 8

A mixture useful for acidifying oil wells drilled into geological areas of predominate clay or silicate composition may be prepared as follows:

(a) Twenty-five parts hydrochloric acid (HCl, density=1.19 g/cc) and twenty-five parts of Table IV solution are mixed in a first reactor for ten minutes at ambient temperature.

(b) Twenty-five parts of hydrofluoric acid (HF, density=1.42 g/cc) and twenty-five parts of Table IV solution are mixed in a second reactor for ten minutes at ambient temperature and are then combined with the contents of the first reactor.

The mixture of Example 8 can be pumped into an oil well at temperatures below 160° F. The hydrofluoric acid component of the mixture vigorously attacks any silicate compounds surrounding the well bore and the remaining components assist in dissolving the oil trapped within the silicate compounds. At the conclusion of the oil dissolving process, the freed oil and the mixture may be pumped from the well bore and separated from one another at the surface.

EXAMPLE 9

Recovery of oil from oil-containing tar sands and treatment of heavy and ultra-heavy crudes may be carried out with a mixture of Table II solution, oleic acid and kerosene prepared in the following sequence:

(a) Twenty-five parts of oleic acid are added to twenty-five parts of Table II solution at ambient temperature and mixed vigorously for ten minutes.

(b) Fifty parts of kerosene are then added at ambient temperature to the oleic acid and Table II solution and the mixture is vigorously agitated.

As noted above, the foregoing mixture is suitable both for treating crude oils and for recovering oil from tar sands, oil pits and the like. The oleic acid component of the mixture is especially important with respect to treatment of crude. As will be discussed shortly, the relationship between the chemistry of oleic acid and the chemistry of petroleum hydrocarbons is such that oleic acid interacts with the crude to produce unexpected but highly beneficial results. According to the Animal Theory of petroleum formation, crude petroleum is formed by hydrocarbons derived from animal fat. Specifically, the carcasses of dead animals are progressively buried at greater and greater depths due to the shifting of the earth's surface and are thereby subjected to extreme pressures. Over long periods of time, these extreme pressures break the animal fat down into glycerine and non-saturated hydrocarbons, i.e., oleofin and acroleine. Through subsequent condensation, oxidation and reduction, the glycerine and non-saturated hydrocarbons are converted into aromatic hydrocarbons or petroleum. Using the Animal Theory as a starting point, an investigation of the composition of animal fat was undertaken in connection with the development of the present invention. It was initially observed that between 40% and 50% of the content of animal fat was comprised of oleic acid, chiefly in the form of a tri-ester of glycerine. This observation in turn lead to the attempt to combine oleic acid with Table II solution in order to arrive at a mixture which favorably modifies the properties of heavy crudes, i.e., crudes with a heavy asphaltene concentration.

Oleic acid has eight known isomers and consists basically of an olefin chain with a carboxylic group. The general chemical formulation is set forth as:

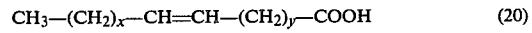

$$CH_3-(CH_2)_x-CH=CH-(CH_2)_y-COOH \qquad (20)$$

Addition of the Table II solution to solubilized oleic acid establishes a mixture conducive to the transformation of the oleic acid into one or more of its various isomers. Agitation of this mixture exposes the isomers to air, resulting in isomer oxidation. During oxidation, the double joint characteristic of the oleic acid isomers are broken down, first yielding hydroxyacids and then, after further decomposition, producing aliphatic chains consisting of mono- and di-carboxylic groups, i.e.:

$$CH_3(CH_2)_xCH=CH(CH_2)_yCOOH \xrightarrow{air} \qquad (21)$$

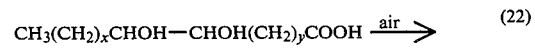

$$CH_3(CH_2)_xCHOH-CHOH(CH_2)_yCOOH \xrightarrow{air} \qquad (22)$$

$$CH_3(CH_2)_nCOOH/HOOC(CH_2)_nCOOH \qquad (23)$$

It is thought that the oxidation reductions of Equations (21)–(23) in combination with the action of the constituents of the Table II solution, play a significant role in the treatment of heavy crude oils. In particular, when the mixture of oleic acid, Table II solution and kerosene is brought into contact with a given volume of crude containing a heavy asphaltene concentration, the Table II solution components attack and break apart the long, complex hydrocarbon chains characteristic of the asphaltene. Lighter, shorter hydrocarbon chains are thus formed and the viscosity of the crude is reduced appreciably. The acid constituents of the Table II solution also assist in removing the sticky grip of any solids present in the crude, permitting the crude to liquefy completely. Sulfurs in the crude are simultaneously diminished, primarily, it is believed, because of reaction between the sulfurs and the non-saturated acids in the mixture. The kerosene component of the mixture basically acts as a vehicle for facilitating free flow of the crude. Meanwhile, the various oxidation reductions set forth in Equations (21)–(23) generate a surplus of carbon ions. Although the mechanisms involved are not at present understood, it appears that the carbon ions react with the olefin chains from the oleic acid in the presence of the crude hydrocarbon chains, transforming the olefins into alcanes or aromatic hydrocarbons in a process which consumes the water present in the Table II solution. The final product is an essentially light, de-sulfured crude having a greater concentration of aromatic hydrocarbons than were present in the volume of crude originally brought into contact with the mixture.

Contact between the crude oil and the foregoing mixture additionally eliminates water emulsions present in the crude and assists in the dehydration thereof. After the crude has been treated, a water washing can be performed to separate the sulfurs and other undesirable components of the crude from the petroleum hydrocarbons. Separation is achieved by virtue of the polar phase and non-polar phase distinctions between the various crude constituents. Inasmuch as water is highly polar and sulfur is a polar phase substance, the sulfur components of the crude will dissolve or pass into the water during washing while solids present in the crude will precipitate. In contrast, the non-polar phase constituents of the mixture, e.g., the hydrocarbons, will remain floating at the top of the water and can be recovered in pure form. Once treated in this manner, the crude will retain its relatively low viscosity and remain liquefied indefinitely.

The advantageous properties associated with the mixture of Example 9 can be exploited in various ways. Apart from the heretofore described method of directly treating heavy crudes, the mixture can be used to clear asphaltene from clogged oil wells and to assist in the recovery of heavy crudes from down-hole formations. The mixture can be applied to oil tanks, pipelines and other oil-handling equipment to remove black products and oil residues which have been deposited therein.

When the mixture of Example 9 is brought into contact with tar sands at ambient temperature, the acid constituents of the mixture work to break the grip of the sand on the oil. Individual granules of sand are thus separated from the oil, permitting full recovery of the oil while leaving the sand behind. The entire recovery process can be carried out in a vat or like reactor containing water. The tar sand and the mixture are simply combined in the vat with the water and the vat is agitated. The sand will subsequently fall to the bottom of the vat, but the oil rises to float on the surface of the mixture where it can be easily removed.

If desired, additional kerosene can be employed with the mixture of Example 9. The amount of Table II solution present in the mixture can then be reduced and the oleic acid component decreased to lower the overall cost of the mixture. Table III solution can also be substituted for Table II solution to further lower costs. Table III solution is somewhat less expensive to manufacture, but when combined with oleic acid and kerosene yields results which compare favorably to those obtained using Table II solution.

Although the preferred concentrations for the various components in the solutions and mixtures of the present invention are shown in the foregoing Tables and Examples, wide variations in these concentrations may be tolerated. Table V lists acceptable ranges for each of the components in the solutions of Tables II and III:

TABLE V

| Component | Range (Concentration by Weight) |
| --- | --- |
| Hydrochloric Acid | 1%–60% |
| Phosphoric Acid | 0.2%–60% |
| Oxalic Acid | 0.1%–10% |
| Citric Acid | 0.1%–25% |
| Oxalic Acid Salts | 0.1%–10% |

Table VI lists the acceptable ranges of concentration for each of the acids added to the Table II and III solutions in Examples 3–8:

TABLE VI

| Component | Range (Concentration by Volume) |
| --- | --- |
| Hydrofluoric Acid | 0.5%–60% |
| Hydrochloric Acid | 2%–90% |
| Sulfuric Acid | 1%–66% |
| Phosphoric Acid | 0.5%–70% |

Table VII lists the acceptable ranges of concentrations for each of the components in the mixture of Example 9:

TABLE VII

| Component | Range (Concentration by Volume) |
| --- | --- |
| Table II solution | 5.0%–50.0% |
| (Table III solution) | (5.0%–45.0%) |
| Oleic acid | 0.5%–50.0% |
| Kerosene | 10.0%–80.0% |

The present invention has been set forth in the form of several preferred embodiments. It is nevertheless understood that modifications to the uses of the acid solutions disclosed herein may be made by those skilled in the art without departing from the scope and spirit of the present invention. Moreover, such modifications are considered to be within the purview of the appended claims.

What is claimed is:

1. A method for acidizing wells surrounded by clay or silicate formations, said method comprising the steps of:
  (a) mixing water and hydrochloric acid with relatively smaller amounts of phosphoric, oxalic and citric acids and urotropine to form a first solution, said hydrochloric acid present in said first solution having a concentration of 1–60 percent by weight of said first solution, said phosphoric acid present in said first solution having a concentration of 0.2 percent by weight of said first solution, said oxalic acid present in said first solution having a concentration of 0.1–10 percent by weight of said first solution and said citric acid present in said first solution having a concentration of 0.1–25 percent by weight of said first solution;
   (b) forming a second solution by mixing a portion of said first solution with additional hydrochloric acid;
   (c) forming a third solution by mixing the remaining portion of said first solution with hydroflouric acid;
   (d) forming a fourth solution by mixing said second and third solutions; and
   (e) introducing said fourth solution into the well and into contact with the clay or silicate formations.

2. A method as set forth in claim 1, wherein said step of forming said second solution includes mixing equal parts of said portion of said first solution and said additional hydrochloric acid.

3. A method as set forth in claim 1, wherein said step of forming said third solution includes mixing equal parts of said remaining portion of said first solution and said hydroflouric acid.

4. A method as set forth in claim 1, wherein said step of forming said first solution includes mixing water at a concentration of 67.25 percent by weight and hydrochloric acid at a concentration of 21 percent by weight with phosphoric acid at a concentration of 5.28 percent by weight, oxalic acid at a concentration of 0.95 percent by weight, citric acid at a concentration of 1.92 percent by weight and urotropine at a concentration of 3.6 percent by weight.

5. A method as set forth in claims 1, 2 or 3, wherein said step of forming said first solution includes the steps of mixing said hydrochloric and phosphoric acids in a first reactor, dissolving said oxalic acid in a portion of said water in a second reactor, combining the contents of said first reactor and said second reactor while simultaneously dissolving said citric acid therein, adding the remaining portion of said water to the combined contents of said first reactor and said second reactor following solubilization of said citric acid, dissolving said urotropine in a portion of the combined contents of said first and second reactors and said solubilized citric acid and adding thereto the remaining portion of the combined contents of said first and second reactors and said solubilized citric acid.

6. A method as set forth in claim 1 wherein said fourth solution is introduced into the well and into contact with the clay or silicate formations at temperatures below approximately 160° F.

7. A method for acidizing wells surrounded by calcareous formations, said method comprising the steps of:
   (a) mixing water and hydrochloric acid with relatively smaller amounts of phosphoric, oxalic and citric acids and urotropine to form a first solution, said hydrochloric acid present in said first solution having a concentration of 1–60 percent by weight of said first solution, said phosphoric acid present in said first solution having a concentration of 0.2–60 percent by weight of said first solution, said oxalic acid present in said first solution having a concentration of 0.1–10 percent by weight of said first solution and said citric acid present in said first solution having a concentration of at least 0.1 percent by weight of said first solution;
   (b) forming a second solution by mixing said first solution with additional hydrochloric acid; and
   (c) introducing said second solution into the well and into contact with the calcareous formations.

8. A method as set forth in claim 7, wherein said step of forming said second solution includes mixing said first solution and said additional hydrochloric acid in a ration ranging between 2:8 and 3:7.

9. A method as set forth in claim 7, wherein said step of forming said first solution includes mixing water at a concentration of 67.25 percent by weight and hydrochloric acid at a concentration of 21 percent by weight with phosphoric acid at a concentration of 5.28 percent by weight, oxalic acid at a concentration of 0.95 percent by weight, citric acid at a concentration of 1.92 percent by weight and urotropine at a concentration of 3.6 percent by weight.

10. A method as set forth in claims 7 or 8, wherein said step of forming said first solution includes the steps of mixing said hydrochloric and phosphoric acids in a first reactor, dissolving said oxalic acid in a portion of said water in a second reactor, combining the contents of said first reactor and said second reactor while simultaneously dissolving said citric acid therein, adding the remaining portion of said water to the combined contents of said first reactor and said second reactor following solubilization of said citric acid, dissolving said urotropine in a portion of the combined contents of said first and second reactors and said solubilized citric acid and adding thereto the remaining portion of the combined contents of said first and second reactors and said solubilized citric acid.

11. A method as set forth in claim 7 wherein said second solution is introduced into the well and into contact with the calcareous formations at temperatures below approximately 176° F.

* * * * *